United States Patent
Tun et al.

(10) Patent No.: US 11,026,445 B2
(45) Date of Patent: Jun. 8, 2021

(54) BEAN ROASTING APPARATUS

(71) Applicant: JIYONSON CO., LTD., Taipei (TW)

(72) Inventors: Yun-Long Tun, Taipei (TW);
Chien-Hung Chen, Taipei (TW);
San-Chi Ho, Taipei (TW)

(73) Assignee: JIYONSON CO., LTD., Taipei (TW)

( * ) Notice: Subject to any disclaimer, the term of this patent is extended or adjusted under 35 U.S.C. 154(b) by 332 days.

(21) Appl. No.: 15/993,379

(22) Filed: May 30, 2018

(65) Prior Publication Data
US 2018/0343913 A1    Dec. 6, 2018

(30) Foreign Application Priority Data

Jun. 1, 2017    (TW) .................. 106207806
Aug. 7, 2017    (TW) .................. 106126572

(51) Int. Cl.
*A23N 12/12*    (2006.01)
*A23N 12/08*    (2006.01)
(Continued)

(52) U.S. Cl.
CPC ......... *A23N 12/125* (2013.01); *A23N 12/083* (2013.01); *A23N 12/10* (2013.01); *F27B 7/42* (2013.01)

(58) Field of Classification Search
CPC .................. A23N 12/10; A23N 12/083; A23N 12/08–12/125; F27B 7/42; A47J 331/42; A47J 42/52; A23F 5/00–5/06
See application file for complete search history.

(56) References Cited

U.S. PATENT DOCUMENTS 5,500,237 A * 3/1996 Gell, Jr. .................. A23F 5/046
                                                      34/360
6,106,877 A * 8/2000 Allington .................. A23F 5/04
                                                      426/233
(Continued)

FOREIGN PATENT DOCUMENTS

CN    104568153 A    4/2015
CN    106579488 A    4/2017
(Continued)

OTHER PUBLICATIONS

Office Action to the corresponding Taiwan Patent Application No. 106126572 rendered by the Taiwan Intellectual Property Office (TIPO) dated Jun. 19, 2018, 12 pages.
(Continued)

*Primary Examiner* — Sarang Afzali
*Assistant Examiner* — Darrell C Ford
(74) *Attorney, Agent, or Firm* — Skaar Ulbrich Macari, P.A.

(57) ABSTRACT

A bean roasting apparatus with a stirring barrel body, a receiving structure and an image capturing assembly is provided. The stirring barrel body has an opening. The receiving structure has a bean-through opening and an observation opening. The image capturing assembly has at least one image capturing device and a reflective surface which is disposed in the capturing scope of the at least one image capturing device and is tilted facing the at least one image capturing device and the observation opening. Therefore, the at least one image capturing device can capture an image inside the receiving structure through the reflective surface and the observation opening. Another bean roasting apparatus with an image capturing assembly is provided, wherein at least one image capturing device of the image
(Continued)

capturing assembly can capture an image inside the receiving structure through the observation opening directly.

16 Claims, 9 Drawing Sheets

(51) Int. Cl.
*A23N 12/10* (2006.01)
*F27B 7/42* (2006.01)

(56) References Cited

U.S. PATENT DOCUMENTS

| | | | | |
|---|---|---|---|---|
| 6,181,427 | B1* | 1/2001 | Yarussi | G01N 21/55 |
| | | | | 356/328 |
| 6,574,425 | B1* | 6/2003 | Weiss | G01N 21/255 |
| | | | | 356/402 |
| 7,285,300 | B1 | 10/2007 | Allington et al. | |
| 2003/0169421 | A1 | 9/2003 | Ehbets | |
| 2004/0214123 | A1* | 10/2004 | Schmidt | F27B 7/42 |
| | | | | 432/19 |
| 2006/0283337 | A1* | 12/2006 | Kato | A23N 12/10 |
| | | | | 99/467 |
| 2008/0079943 | A1* | 4/2008 | Li | G01N 21/57 |
| | | | | 356/445 |
| 2009/0130277 | A1* | 5/2009 | Bressner | A23N 12/08 |
| | | | | 426/466 |
| 2014/0029963 | A1 | 1/2014 | Nakai et al. | |
| 2014/0076167 | A1* | 3/2014 | Boggavarapu | A47J 31/42 |
| | | | | 99/286 |
| 2014/0242239 | A1 | 8/2014 | Boggavarapu | |
| 2016/0120211 | A1 | 5/2016 | Wilson et al. | |
| 2017/0360242 | A1* | 12/2017 | Boggavarapu | A23N 12/125 |
| 2021/0015140 | A1* | 1/2021 | Huang | A23N 12/125 |

FOREIGN PATENT DOCUMENTS

| | | |
|---|---|---|
| CN | 106580120 A | 4/2017 |
| EP | 0375317 A2 | 6/1990 |
| JP | S60146567 A | 8/1985 |
| JP | H02103426 A | 4/1990 |
| JP | H06201471 A | 7/1994 |
| JP | H09200435 A | 7/1997 |
| JP | 2000121444 A | 4/2000 |
| JP | 2011088097 | 5/2011 |
| JP | 2015046650 | 3/2015 |
| JP | 2016123303 A | 7/2016 |
| KR | 101370195 B1 | 3/2014 |
| TW | 461255 U | 10/2001 |
| TW | 201240634 A | 10/2012 |
| TW | M532167 | 11/2016 |
| WO | 9956601 A1 | 11/1999 |
| WO | 2013006718 A1 | 1/2013 |
| WO | 2016117071 A1 | 7/2016 |

OTHER PUBLICATIONS

The extended European Search Report rendered by the European Patent Office for European Patent Application No. 18175109.0 dated Oct. 18, 2018, 7 pages.

Office Action to the corresponding Japanese Patent Application rendered the Japan Patent Office (JPO) dated May 21, 2019, 8 pages (including English summary).

Office Action to the corresponding Japanese Patent Application rendered by the Japanese Patent Office (JPO) dated Dec. 3, 2019, 8 pages (including English summary).

Office Action to the corresponding Chinese Patent Application rendered by the China National Intellectual Property dministration (CNIPA) dated May 8, 2020, 11 pages.

* cited by examiner

BEAN ROASTING APPARATUS

PRIORITY

This application claims priority to Taiwan Patent Application No. 106207806 filed on Jun. 1, 2017 and Taiwan Patent Application No. 106126572 filed on Aug. 7, 2017, both of which are hereby incorporated by reference in their entirety.

FIELD

The present invention provides a bean roasting apparatus, and in particular, a bean roasting apparatus comprising an image capturing assembly.

BACKGROUND

Roasting beans, such as coffee beans or coix seeds, takes a lot of experience and skill. To maintain a good roasting quality of beans using technical equipment, the roasting temperature and time need to be precisely controlled by manually observing the color, smell, and sound of the roasted beans or the like. The complexity of the technology makes it hard to precisely duplicate the same flavor in the roasting process even by a same professional roaster.

In addition to carefully listening to the sound of cracking beans when they are heated and smelling the flavor of the beans in the roasting process, observing the color, change in size and shape of the skin of the beans is also very important. Under the current roasting mechanism, the user usually scoops out the beans from a roaster to observe the color of the beans using the naked eye. However, the bean roasting and the part of the beans is influenced, even if the user can make a quick judgment and then put the beans back into the roaster. Moreover, it is hard to reflect the roasting status of the beans in real time and to record the color, size and shape of the skin of the beans in real time at each observation, because the bean roasting process is still in progress after the user scoops out the beans for observation.

Although the installation of camera equipment in a bean roaster current available may help to monitor the bean roasting process, it is difficult to coordinate the two devices. Moreover, it is difficult to capture a clear image or the camera equipment is likely to be damaged due to a high temperature that is generated during the roasting process or the like.

Accordingly, a need exists in the art to provide a bean roasting apparatus, which comprises equipments such as a camera apparatus or a microphone to assist the user in monitoring the bean roasting status easily, thereby, maintaining the roasting quality more precisely and prolonging the durability of the camera.

SUMMARY

An objective of certain embodiments of the present invention includes providing a bean roasting apparatus, which can assist the user in easily monitoring the bean roasting status to control the roasting time precisely and maintain good roasting quality, and prevent camera equipment from being damaged due to the high temperature generated during the roasting process to prolong the service life of the equipment. Preferably, the bean roasting apparatus may also be electrically connected with an electronic product that has a processor such as a computer or a smart mobile device or the like to analyze the roasting status of the beans, and adjust the parameters of the bean roasting apparatus according to the roasting status to achieve automation of bean roasting.

The disclosure includes a bean roasting apparatus comprising a stirring barrel body, a receiving structure and an image capturing assembly. The stirring barrel body comprises an opening. The receiving structure is disposed on a side of the stirring barrel body and comprises a bean-through opening and an observation opening, wherein the bean-through opening is connected to the opening. The image capturing assembly is disposed on a side of the receiving structure and comprises at least one image capturing device and a reflective surface which is disposed within a capturing scope of the at least one image capturing device and is tilted to face the at least one image capturing device and the observation opening. The at least one image capturing device is configured to capture an image inside the receiving structure through the reflective surface and the observation opening.

The image capturing assembly included in the bean roasting apparatus can include a light emitting device. The light emitting device faces the observation opening and is configured to illuminate the inside of the receiving structure through the observation opening.

The light emitting device of the image capturing assembly included in the bean roasting apparatus can include at least one light emitting diode or light bulb.

The image capturing assembly included in the bean roasting apparatus can include a housing structure. The at least one image capturing device, the reflective surface and the light emitting device are disposed within the housing structure.

The housing structure of the image capturing assembly included in the bean roasting apparatus can include a first opening and a second opening. The reflective surface faces the observation opening through the first opening and the light emitting device faces the observation opening through the second opening.

The image capturing assembly included in the bean roasting apparatus can include two transparent components, e.g., glass, plastic or the like. The two transparent components are disposed at the first opening and the second opening respectively.

The image capturing assembly included in the bean roasting apparatus can include two sealing components which are disposed between the two transparent components and the housing structure respectively.

The image capturing assembly included in the bean roasting apparatus can include a housing structure, and the at least one image capturing device and the reflective surface are disposed within the housing structure.

The housing structure of the image capturing assembly included in the bean roasting apparatus can include a first opening. The reflective surface faces the observation opening through the first opening.

The image capturing assembly included in the bean roasting apparatus can include a heat sink which is disposed on the housing structure or on a side of the image capturing device.

The image capturing assembly included in the bean roasting apparatus can include one protective lens which is disposed in front of the at least one image capturing device.

The image capturing assembly included in the bean roasting apparatus can include a sealing component disposed between the protective lens and the at least one image capturing device.

The image capturing assembly included in the bean roasting apparatus can be movably disposed on a side of the receiving structure.

The image capturing assembly included in the bean roasting apparatus can include a sliding component and a rotating component.

The bean roasting apparatus can include at least one microphone which is disposed on a side of the stirring barrel body to retrieve the cracking sound of the beans as a reference for moving the beans out of the bean roasting apparatus.

The reflective surface of the image capturing assembly included in the bean roasting apparatus can be a surface of a reflective mirror or a prism.

The disclosure also includes a bean roasting apparatus and an image capturing assembly thereof that comprises at least one image capturing device. The observation opening is disposed within a capturing scope of the at least one image capturing device so that the at least one image capturing device captures an image inside the receiving structure through the observation opening directly.

The disclosure further includes a bean roasting apparatus which comprises a roasting barrel body and an image capturing assembly. The roasting barrel body comprises an observation window. The image capturing assembly is disposed on the observation window and comprises at least one image capturing device, and the at least one image capturing device is configured to capture an image inside the roasting barrel body through the observation window.

The detailed technology and preferred embodiments implemented for the subject invention are described in the following paragraphs accompanying the appended drawings for people skilled in this field to well appreciate the features of the claimed invention.

DETAILED DESCRIPTION

In the following descriptions, the present invention will be explained with reference to example embodiments thereof. However, these embodiments are not intended to limit the present invention to any specific example, embodiment, environment, applications or particular implementations described in these embodiments. Therefore, description of these embodiments is only for purpose of illustration rather than to limit the present invention.

Figure 1:
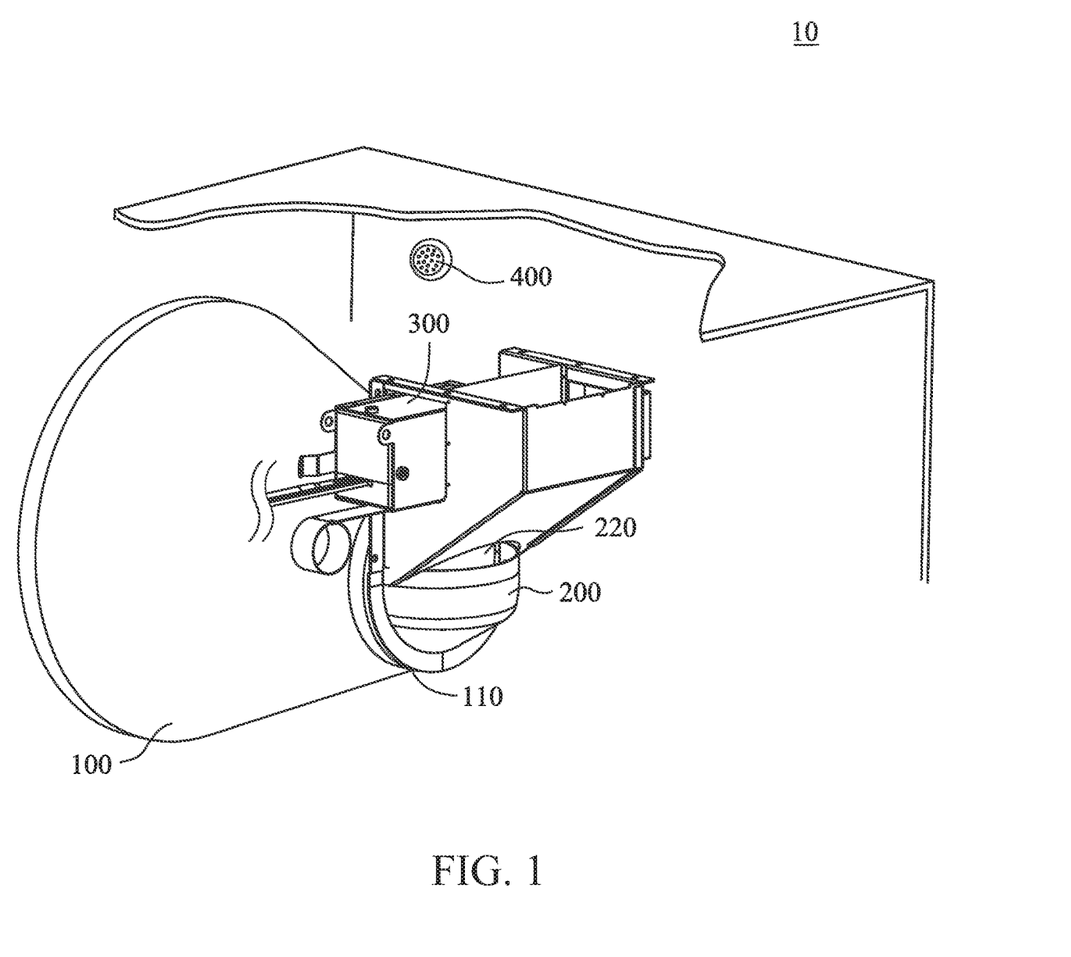
FIG. 1 is a schematic view of a bean roasting apparatus according to the preferred embodiment of the present invention after a part of the shell thereof is removed.
Figure 2:
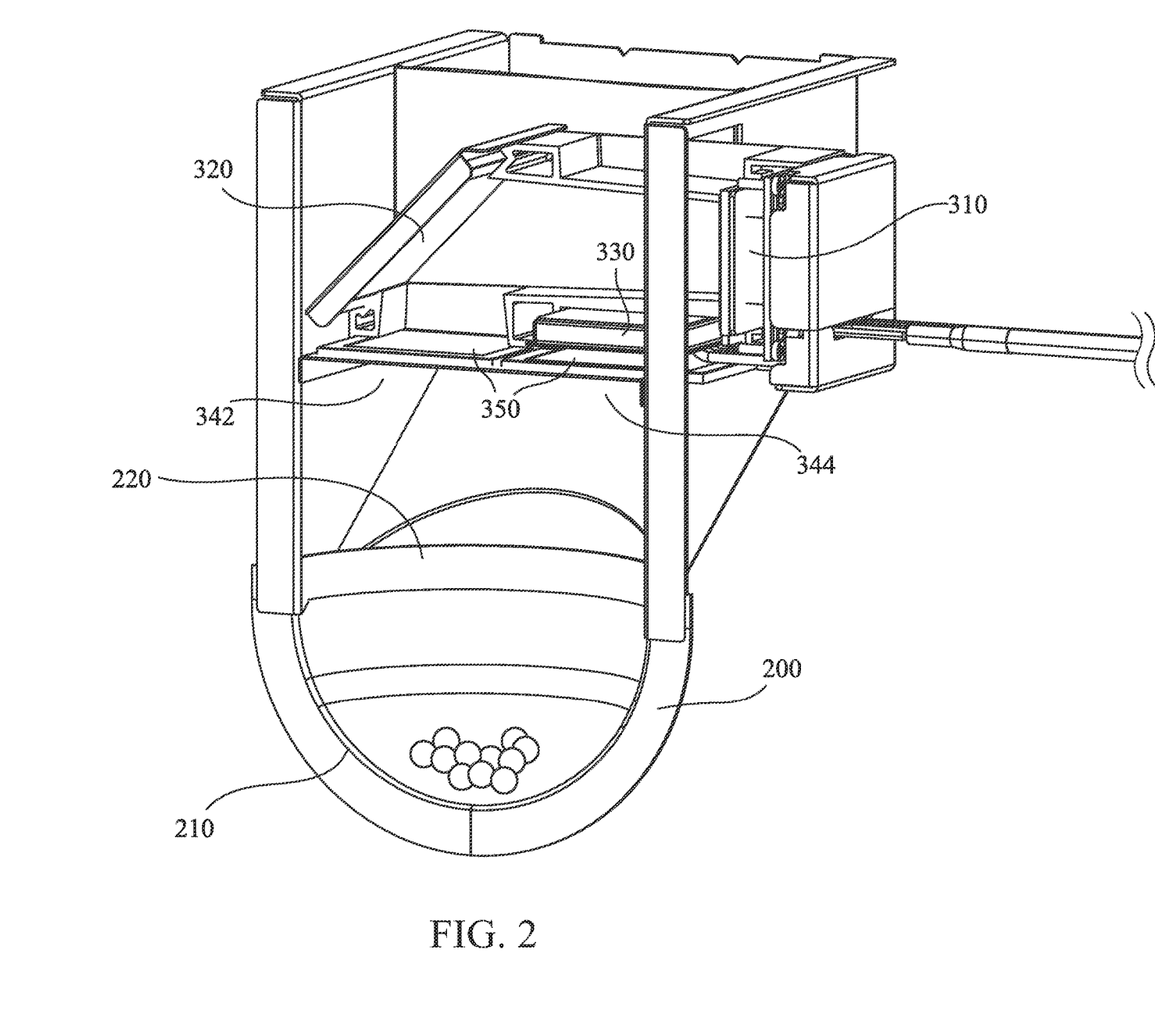
FIG. 2 is a schematic perspective view of a part of the receiving structure and an image capturing assembly of the bean roasting apparatus of FIG. 1.

FIGS. 1 and 2 show a bean roasting apparatus 10 according to the preferred embodiment of the present invention. The bean roasting apparatus 10 may comprise a stirring barrel body 100, a receiving structure 200 and an image capturing assembly 300. Technical contents of these components will be described in sequence as follows.

Figure 6:
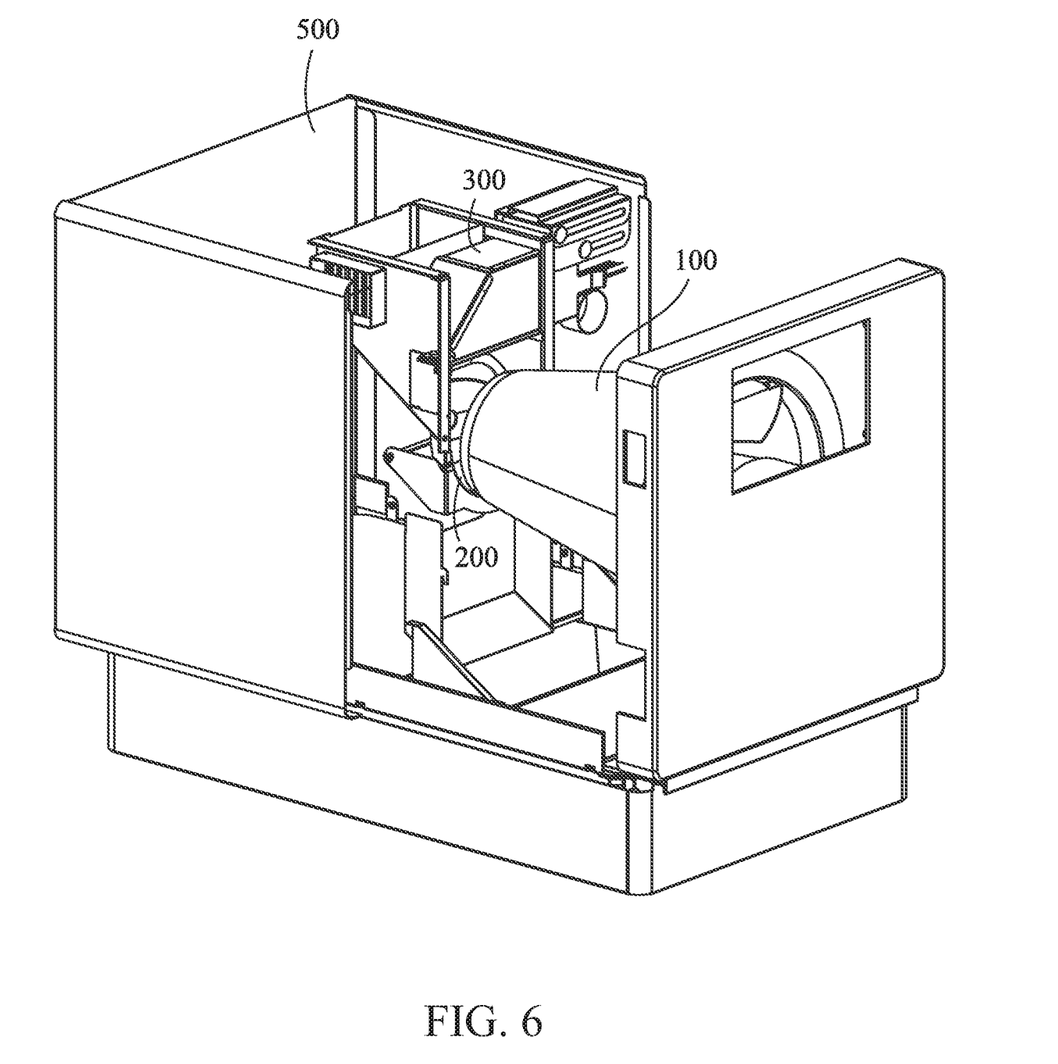
FIG. 6 is a schematic perspective view of a part of the bean roasting apparatus of FIG. 5.
Figure 7:
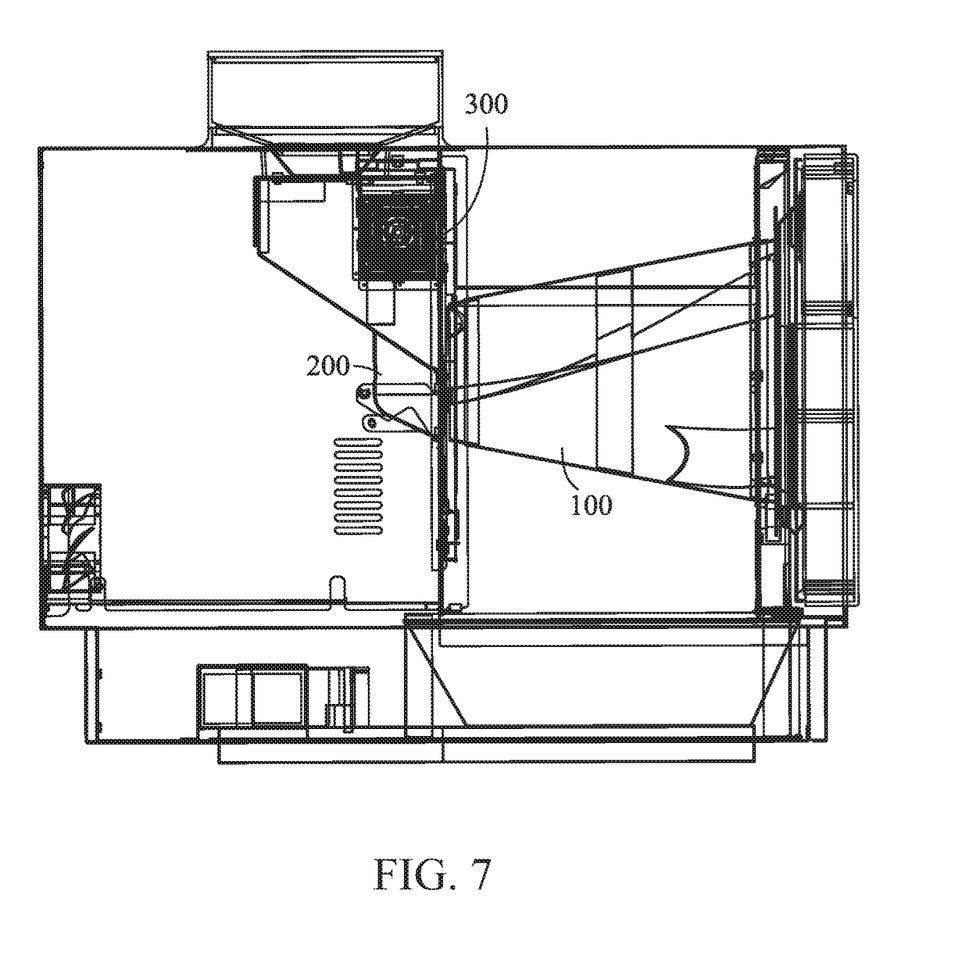
FIG. 7 is a cross-sectional view taken along line A-A of the bean roasting apparatus of FIG. 5.

The stirring barrel body 100 may receive beans (or grains or the like, not shown) to be roasted, and the stirring barrel body 100 may rotate to move, stir and thus, mix the beans together. The stirring barrel body 100 comprises at least one opening 110. The beans may enter into or be removed out of the stirring barrel body 100 via the opening 110. Reference may be made to Taiwan Patent Application No. 102127710 filed previously by the applicant for a specific structure of the stirring barrel body 100 (as shown in FIG. 6 and FIG. 7), but the specific structure is not limited thereto and the stirring barrel body 100 may also include or be implemented into other structures.

The receiving structure 200 is disposed on a side of the stirring barrel body 100 and comprises a bean-through opening 210 and an observation opening 220. The bean-through opening 210 is connected to the opening 110 of the stirring barrel body 100, and the observation opening 220 faces a different direction as compared to the bean-through opening 210 (e.g., the observation opening 220 faces upward, while the bean-through opening 210 faces forward). Relative to a great number of beans received in the stirring barrel body 100, the receiving structure 200 only receives a small number of the beans. The receiving structure 200 comprises a structure such as an inclined surface or a curved surface (which is connected to the bean-through opening 210) so that the beans automatically slide downward and return back into the stirring barrel body 100 through the bean-through opening 210. In other words, the beans are temporarily received in the receiving structure 200. Additionally, the beans that are roasted may also first enter into the receiving structure 200 from the observation opening 220, and then enter into the stirring barrel body 100 via the bean-through opening 210.

The image capturing assembly 300 is disposed on the side of the receiving structure 200 and keeps a distance from the stirring barrel body 100. Moreover, a support structure (not labeled) may fix and hold the image capturing assembly 300 at the side of the receiving structure 200. In this embodiment, the image capturing assembly 300 comprises an image capturing device 310 and a reflective surface 320, the image capturing device 310 may be a device capable of capturing images such as a camera or a video camera or the like, and the reflective surface 320 is disposed within a capturing scope of the image capturing device 310 and is tilted to face the image capturing device 310 and the observation opening 220. The reflective surface 320 may be a surface of a reflective mirror or a prism. Therefore, through the observation opening 220, light from the inside of the receiving structure 200 may reach the reflective surface 320 and then be reflected by the reflective surface 320 to the image capturing device 310 and is received by the image capturing device 310 to form image data. In other words, the image capturing device 310 may capture an image inside the receiving structure 200 through the reflective surface 320 and the observation opening 220.

It shall be additionally appreciated that the image capturing assembly 300 may also comprise one or more (e.g., two, three or the like) image capturing devices 310 (not shown)

to capture multiple images of the beans within the receiving structure 200 from different angles or positions. Alternatively, the image capturing devices 310 may be located at the same position or angle, but capture multiple images of the beans within the receiving structure 200 at different focal lengths. These images may be processed and analyzed to provide a perspective image or an image with depth information of the beans to be used by the user as a further reference for the roasting status of the beans.

Accordingly, when the bean roasting apparatus 10 operates (roasts beans), part of the beans in the stirring barrel body 100 will enter into the receiving structure 200 through the opening 110 and the bean-through opening 210 and return back into the stirring barrel body 100 after a short period of residence and continue to be roasted, during the moving and stirring processes. At this point, the image capturing device 310 may rapidly and clearly capture the image of the beans within the receiving structure 200 through the reflective surface 320 and the observation opening 220. The user can see the roasting status of the beans in real time through a screen built in the bean roasting apparatus or an external screen (not shown) that is electrically connected with the image capturing device 310. Moreover, when the image capturing device 310 captures the image of the beans, the roasting of the beans is less likely to be influenced.

The image capturing device 310 may also be electrically connected to an electronic product (a computer or the like, not shown), and the electronic product can analyze the image of the beans to determine the current roasting status of the beans to adjust the parameters (e.g., the temperature, the rotation rate, the damper or the like) of the bean roasting apparatus 10. The bean roasting device 10 may further comprise at least one microphone 400 which is disposed at one side of the stirring barrel body 100 to retrieve the sound inside the stirring barrel body 100 (e.g., the cracking sound of the beans) during the bean roasting process. The microphone 400 may also be electrically connected to the electronic product so that the electronic product analyzes the audio material to determine the roasting status of the beans as another reference for adjusting the parameters of the bean roasting apparatus 10. The cracking sound of the beans retrieved by the microphone 400 may also serve as a reference for removing the beans out of the bean roasting apparatus 10.

Furthermore, the image capturing device 310 is relatively remote from the stirring barrel body 100, and may capture the image of the beans without the need of entering into the stirring barrel body 100 (or approaching the opening 110), thereby, preventing the image capturing device 310 from being damaged due to high temperature in the stirring barrel body 100 and prolonging the service life of the image capturing device 310.

Next, the technical contents preferably owned by the image capturing assembly 300 will be described.

In FIG. 2, the image capturing assembly 300 further comprises a light emitting device 330. The light emitting device 330 faces the observation opening 220 and is configured to illuminate the inside of the receiving structure 220 through the observation opening 220 to provide the image capturing device 310 with sufficient brightness to capture the image. Additionally, the light emitted from the light emitting device 330 will not directly irradiate the image capturing device 310 and/or the reflective surface 320. The light emitting device 330 may comprise components such as a light emitting diode, light bulb, or the like. Moreover, if the brightness inside the receiving structure 220 is already sufficient, then the light emitting device 300 may be omitted or turned off.

Figure 3:
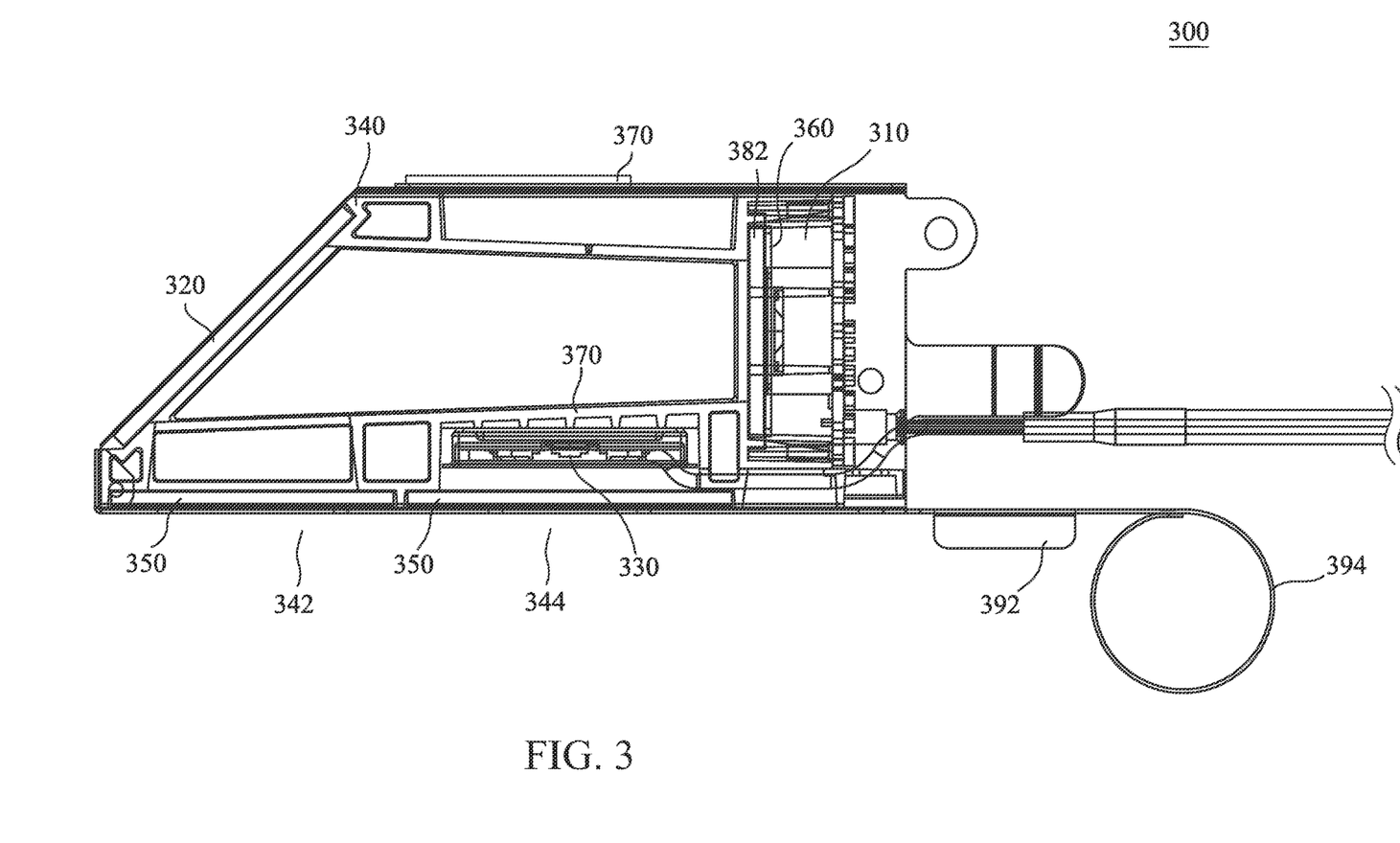
FIG. 3 is a cross-sectional view of the image capturing assembly of the bean roasting apparatus of FIG. 1.
Figure 4:
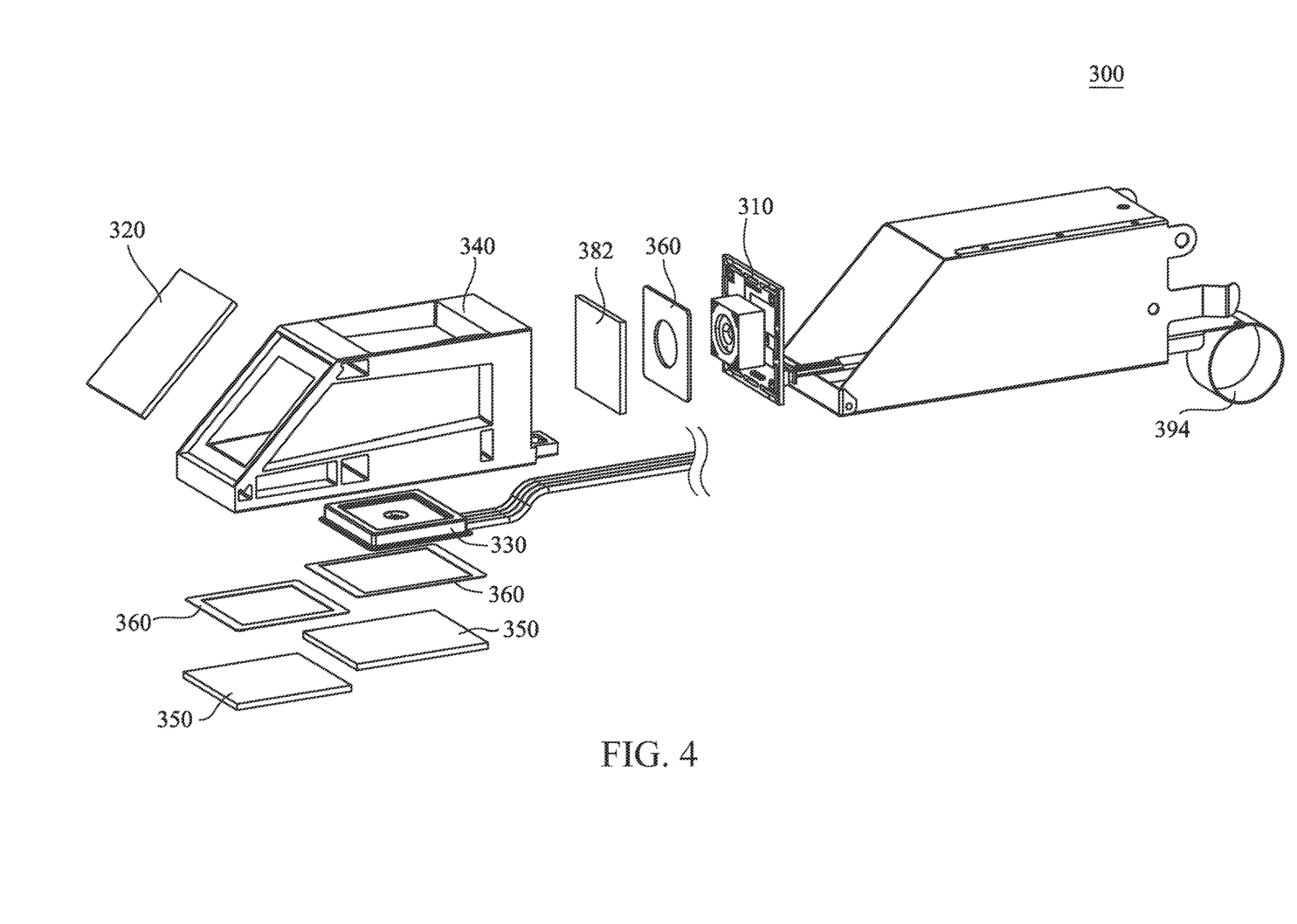
FIG. 4 is an exploded view of the image capturing assembly of the bean roasting apparatus of FIG. 1.

FIGS. 3 and 4 are respectively a cross-sectional view and an exploded view of the image capturing assembly 300. The image capturing assembly 300 further comprises a housing structure 340. The image capturing device 310, the reflective surface 320 and the light emitting device 330 are disposed within the housing structure 340. The housing structure 340 may comprise a first opening 342 and a second opening 344. The reflective surface 320 faces the observation opening 220 through the first opening 342, while the light emitting device 330 faces the observation opening 220 through the second opening 344. If the image capturing assembly 300 does not comprise the light emitting device 330, then the housing structure 340 may only comprise the first opening 342 and the second opening 344 (not shown) is omitted.

The image capturing assembly 300 may further comprise two transparent components 350 and two sealing components 360. The two transparent components 350 are disposed at the first opening 342 and the second opening 344 respectively. The two sealing components 360 are disposed between the two transparent components 350 and the housing structure 340 respectively to isolate dust in the air or debris generated during the roasting process outside the housing structure 340 and prevent damage to the image capturing device 310 and/or the light emitting device 330. The transparent component 350 disposed at the second opening 344 may be glass or plastic or the like, and may be a hazy surface or an opaque surface (not shown in the figure) so that the light emitting by the light emitting device 330 can illuminate the inside of the receiving structure 200 more uniformly.

The image capturing assembly 300 may further comprise a protective lens 382 or a sealing component 360. The protective lens 382 may be disposed in front of the image capturing device 310 to prevent the image capturing device 310 from being damaged due to collision of debris or the like. The sealing component 360 is disposed between the protective lens 382 and the image capturing device 310 to better protect the image capturing device 310.

Additionally, the image capturing assembly 300 may further comprise a heat sink 370 (e.g., a fin, a fan, a fin with fan or the like). The heat sink 370 may be disposed on the housing structure 340 or a side of the image capturing device 310 (not shown) to remove the heat of the housing structure 340 more effectively and prevent the image capturing device 310 from being affected by the heat generated during the operation of the bean roasting apparatus 10. Furthermore, the image capturing assembly 300 may also be movably disposed on the side of the receiving structure 200. For example, the image capturing assembly 300 comprises a sliding component 392 and a rotating component 394 so that the user removes and rotates the image capturing assembly 300 from the bean roasting apparatus 10 through the sliding component 392 and the rotating component 394, thereby, cleaning or replacing the image capturing assembly 300. In other words, the image capturing assembly 300 may rotate or even be separated or detached from one side of the receiving structure 200 to be cleaned or replaced.

Figure 5:
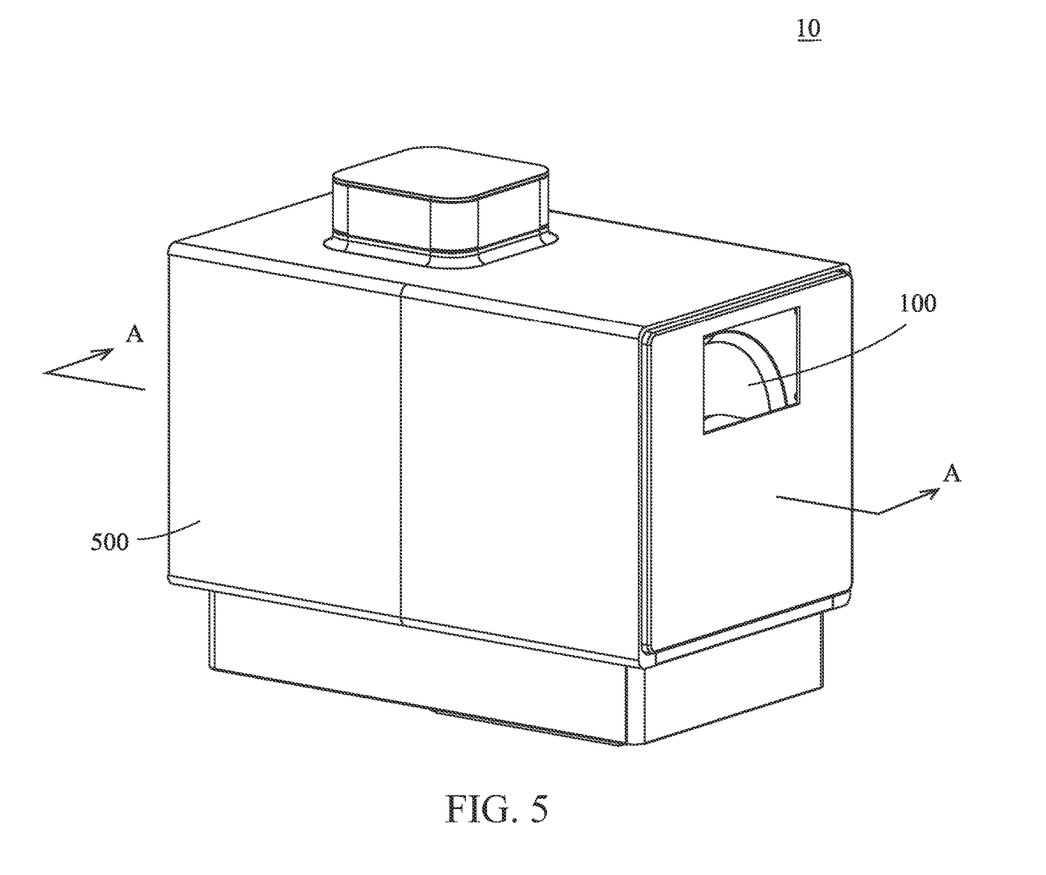
FIG. 5 is a perspective view of the bean roasting apparatus of FIG. 1 comprising the shell.

With reference to FIGS. 5 to 7, the bean roasting apparatus 10 may also comprise a shell structure 500 or other members (e.g., a bean feeder, a heater, an exhaust equipment or the like). The stirring barrel body 100, the receiving structure 200 and the image capturing assembly 300 (and other members) may be disposed within the shell structure 500 and are not exposed to the outside.

Figure 8:
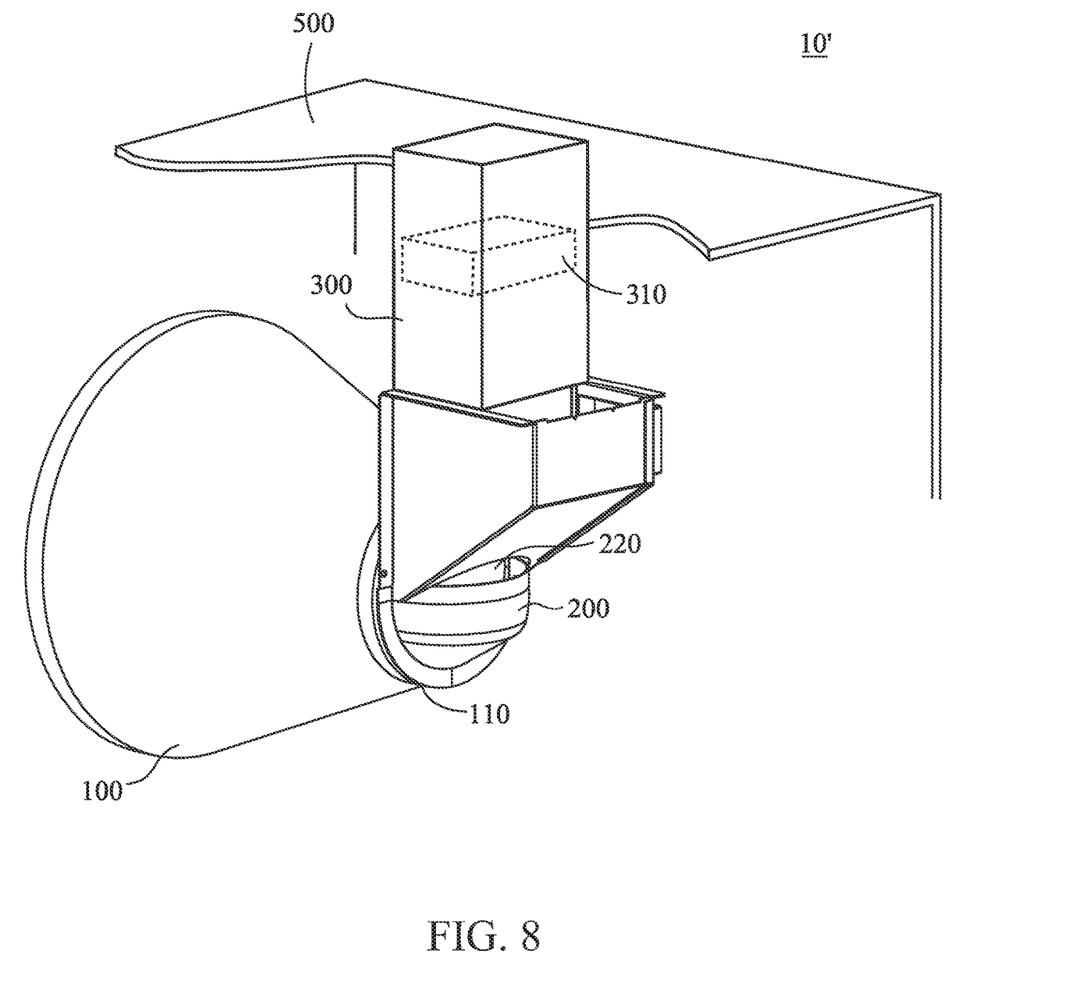
FIG. 8 is a schematic view of a bean roasting apparatus according to another preferred embodiment of the present invention.

FIG. 8 shows a bean roasting apparatus 10' according to another preferred embodiment of the present invention. The bean roasting apparatus 10' comprises components that are similar to these of the bean roasting apparatus 10, so mutual reference may be made between the technical contents of the bean roasting apparatus 10' and the bean roasting apparatus 10 and this will not be further described herein. The difference between the bean roasting apparatus 10' and the bean roasting apparatus 10 lies in that the image capturing assembly 300 of the bean roasting apparatus 10' may not comprise the reflective surface, but the observation opening 220 of the receiving structure 200 is within the capturing scope of the image capturing device 310. That is, the image capturing device 310 directly faces the observation opening 220 to capture the image inside the receiving structure 200 directly through the observation opening 220. Because the image capturing device 310 is away from the stirring barrel body 100, the image capturing device 310 is less likely to be damaged due to the high temperature of the stirring barrel body 100 so that the service life of the image capturing device 310 is prolonged. Furthermore, the image capturing assembly 300 is partly exposed outside the shell structure 500 so that the user can contact the exposed portion to move or remove the image capturing assembly 300. However, the image capturing assembly 300 may also be implemented as being overall disposed inside the shell structure 500 (e.g., the case shown in FIG. 7).

Figure 9:
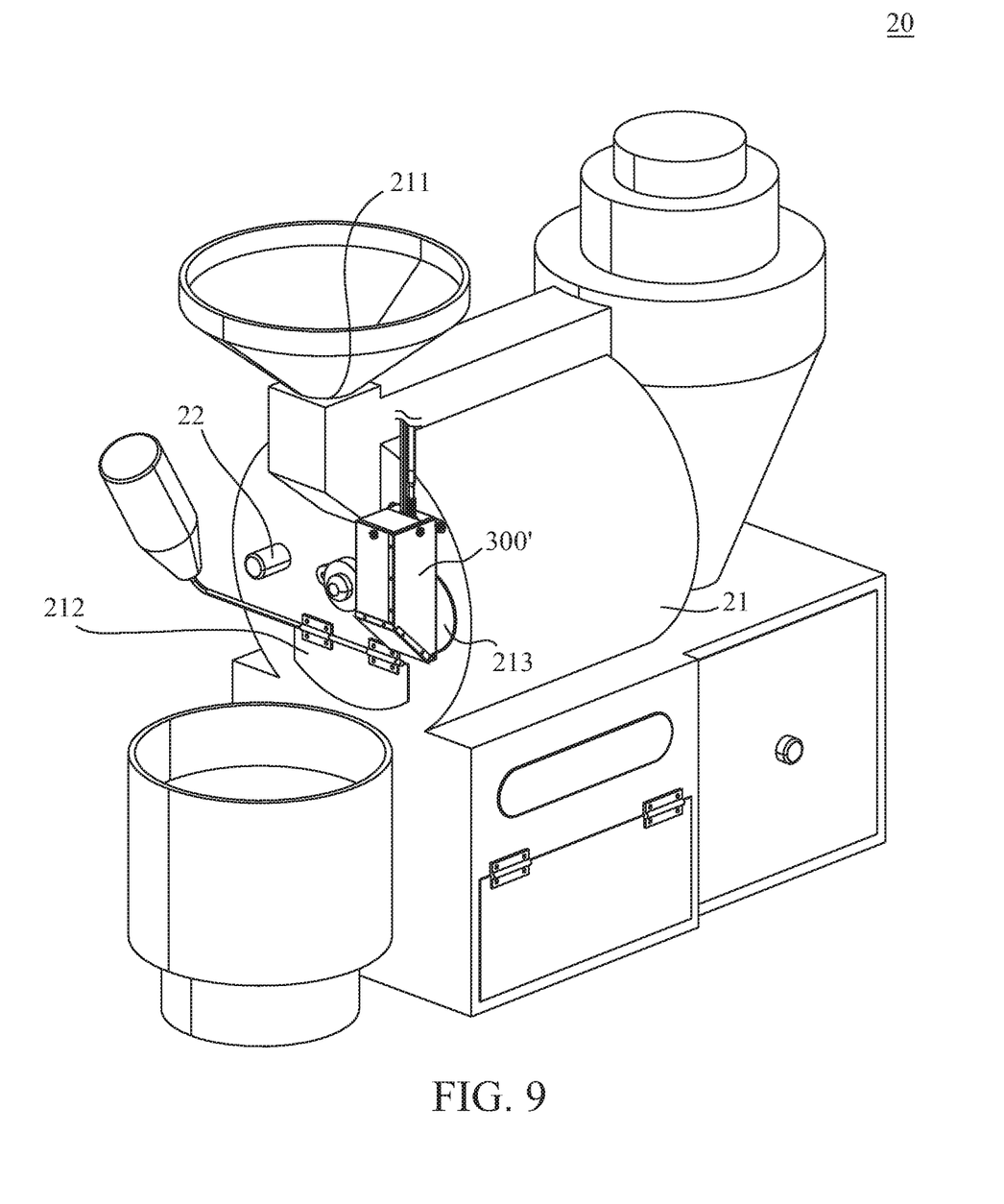
FIG. 9 is a schematic view of a bean roasting apparatus according to yet another preferred embodiment of the present invention.

FIG. 9 shows a bean roasting apparatus 20 according to another preferred embodiment of the present invention. The bean roasting apparatus 20 may comprise a roasting barrel body (or called a housing) 21 and an image capturing assembly 300'. The image capturing assembly 300' comprises components that are similar to these of the image capturing assembly 300 of the aforesaid embodiments, so mutual reference may be made between the technical contents of the image capturing assembly 300' and the image capturing assembly 300 and this will not be further described herein.

The roasting barrel body 21 may receive coffee beans (or other grains or the like, not shown) to be roasted, and it may comprise equipments (not shown) such as a stirring barrel body (which may be a stirring barrel body of a general construction or the aforesaid stirring barrel body 100) therein to stir and roast the coffee beans. The roasting barrel body 21 additionally comprises a feeding opening 211, a discharge opening 212 and an observation window 213. In this embodiment, the feeding opening 211 is disposed at an upper side of the roasting barrel body 21 and it may be connected with a funnel to make it convenient for the user to put materials to be roasted into the roasting barrel body 21. The discharge opening 212 is disposed at a side surface of the roasting barrel body 21. The user can take out the materials that have been well roasted through the discharge opening 212. The observation window 213 (which may be made of materials such as transparent glass or plastic or the like) is disposed on the side surface of the roasting barrel body 21, and in this embodiment, the observation window 213 and the discharge opening 212 are disposed on the same side surface of the roasting barrel body 21. The user can observe the roasting status inside the roasting barrel body 21 through the observation window 213 and take out the materials if needed, but it is not limited thereto. The roasting barrel body 21 may also comprise other equipments, such as a heater, an exhaust equipment or the like, and the arrangement of these equipments can be changed according to requirements of the user.

The bean roasting apparatus 20 may further comprise a scoop (or called a sample scoop) 22, and the scoop 22 is disposed at one side of the roasting barrel body 21 with one end thereof located within the roasting barrel body 21 and the other end thereof protruding outside the roasting barrel body 21, thereby making it convenient for the user to hold the scoop and scoop out the beans or grains that are being roasted for further observation.

The image capturing assembly 300' may be disposed on the observation window 213 by bonding, fastening or buckling or the like, so the image capturing assembly 300' is located outside the roasting barrel body 21 on the whole. The image capturing assembly 300' comprises at least one image capturing device 310 (as shown in FIG. 2 or FIG. 8), and the at least one image capturing device 310 is configured to capture an image inside the roasting barrel body 21 through the observation window 231. The image capturing device 310 may capture the image directly through the observation window 231 (as shown in FIG. 8) or capture the image through a reflective surface 320 and the observation window 231 (as shown in FIG. 2).

Through the aforesaid technical contents, the bean roasting apparatus of the present invention can make it convenient for the user to monitor the bean roasting status in real time without influencing the bean roasting process, and meanwhile, reduce the probability of damage to the camera equipment. Moreover, the bean roasting apparatus of the present invention can be further connected with the electronic product (not shown) of which the program is executed to automatically monitor the bean roasting status together with the bean roasting apparatus, and parameters such as the roasting time and the temperature or the like can be adjusted depending on preferences preset by the user, thereby, stably roasting beans with high quality.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A bean roasting apparatus for beans, comprising:
   a stirring barrel body, comprising an opening;
   a receiving structure, disposed on a side of the stirring barrel body, and comprising a bean-through opening and an observation opening, wherein the bean-through opening is connected to the opening; and
   an image capturing assembly, disposed on a side of the receiving structure and comprising at least one image capturing device and a reflective surface which is disposed within a capturing scope of the at least one image capturing device and is tilted to face the at least one image capturing device and the observation opening;
   wherein the at least one image capturing device is configured to capture an image inside the receiving structure through the reflective surface and the observation opening;
   wherein the receiving structure further comprises an inclined or curved surface towards the stirring barrel body and connected to the bean-through opening, so that some of the beans can be continuously and temporarily received in the receiving structure through the opening of the stirring barrel body and the bean-through opening, and then slide downward and return back into the stirring barrel body through the bean-through opening and the opening of the stirring barrel body while the beans are roasting.

2. The bean roasting apparatus of claim 1, wherein the image capturing assembly further comprises a light emitting device facing the observation opening and configured to illuminate the inside of the receiving structure through the observation opening.

3. The bean roasting apparatus of claim 2, wherein the image capturing assembly further comprises a housing structure, the at least one image capturing device, the reflective surface and the light emitting device are disposed within the housing structure.

4. The bean roasting apparatus of claim 3, wherein the housing structure comprises a first opening and a second opening, the reflective surface facing the observation opening through the first opening and the light emitting device facing the observation opening through the second opening.

5. The bean roasting apparatus of claim 4, wherein the image capturing assembly further comprises two transparent components which are disposed at the first opening and the second opening respectively.

6. The bean roasting apparatus of claim 5, wherein the transparent component disposed at the second opening is glass or plastic.

7. The bean roasting apparatus of claim 5, wherein the image capturing assembly further comprises two sealing components which are disposed between the two transparent components and the housing structure respectively.

8. The bean roasting apparatus of claim 1, wherein the image capturing assembly further comprises a housing structure, the at least one image capturing device and the reflective surface are disposed within the housing structure.

9. The bean roasting apparatus of claim 8, wherein the housing structure comprises a first opening, and the reflective surface faces the observation opening through the first opening.

10. The bean roasting apparatus of claim 8, wherein the image capturing assembly further comprises a heat sink which is disposed on the housing structure.

11. The bean roasting apparatus of claim 1, wherein the image capturing assembly further comprises at least one protective lens which is disposed in front of the at least one image capturing device.

12. The bean roasting apparatus of claim 1, wherein the image capturing assembly is movably or detachably disposed on a side of the receiving structure.

13. The bean roasting apparatus of claim 12, wherein the image capturing assembly comprises a sliding component and a rotating component.

14. The bean roasting apparatus of claim 1, further comprising at least one microphone which is disposed on a side of the stirring barrel body.

15. A bean roasting apparatus for beans, comprising:
a stirring barrel body, comprising an opening;
a receiving structure, disposed on a side of the stirring barrel body, and comprising a bean-through opening and an observation opening, wherein the bean-through opening is connected to the opening; and
an image capturing assembly, disposed on a side of the receiving structure, and comprising at least one image capturing device, wherein the observation opening is disposed within a capturing scope of the at least one image capturing device, and the at least one image capturing device is configured to capture an image inside the receiving structure through the observation opening directly;
wherein the receiving structure further comprises an inclined or curved surface towards the stirring barrel body and connected to the bean-through opening, so that some of the beans can be continuously and temporarily received in the receiving structure through the opening of the stirring barrel body and the bean-through opening, and then slide downward and return back into the stirring barrel body through the bean-through opening and the opening of the stirring barrel body while the beans are roasting.

16. The bean roasting apparatus of claim 15, further comprising a heat sink which is disposed on a side of the image capturing device.

* * * * *